United States Patent [19]

Gustafson

[11] Patent Number: 5,832,364
[45] Date of Patent: Nov. 3, 1998

[54] DISTRIBUTING WIRELESS SYSTEM CARRIER SIGNALS WITHIN A BUILDING USING EXISTING POWER LINE WIRING

[75] Inventor: Warren H. Gustafson, Palm Bay, Fla.

[73] Assignee: AirNet Communications Corp., Melbourne, Fla.

[21] Appl. No.: 540,009

[22] Filed: Oct. 6, 1995

[51] Int. Cl.[6] ................................................ H04B 7/14
[52] U.S. Cl. .......................... 455/14; 455/402; 455/561
[58] Field of Search ................................ 455/53.1, 56.1, 455/66, 14, 63, 400, 402, 560, 561; 348/6, 8; 379/64, 66

[56] References Cited

U.S. PATENT DOCUMENTS

| | | |
|---|---|---|
| 3,911,415 | 10/1975 | Whyte . |
| 4,523,307 | 6/1985 | Brown et al. . |
| 4,701,945 | 10/1987 | Pedigo ..................................... 455/400 |
| 4,777,652 | 10/1988 | Stolarczyk ................................. 455/14 |
| 4,850,009 | 7/1989 | Zook et al. . |
| 4,912,553 | 3/1990 | Pal et al. ..................................... 348/8 |
| 5,319,634 | 6/1994 | Bartholomew et al. ................. 455/402 |
| 5,321,736 | 6/1994 | Beasley ..................................... 455/14 |
| 5,327,230 | 7/1994 | Dockery ...................................... 348/8 |
| 5,537,637 | 7/1996 | Sugita et al. ............................... 455/14 |
| 5,634,191 | 5/1997 | Beasley ..................................... 455/14 |

OTHER PUBLICATIONS

Phoenix Corp. Midvale, Utah, Service Manual — Radio Shack Wireless Phone Jack (May 10, 1995).
Propp, Michael, "Use The AC Power Line As A Wireless Medium", Microwaves & RF, May 1995, pp. 27–30.
Landreth, Dan, "In My Opinion Antennas: The Next Frontier", Microwave Product Digest, May 1995, p. 5.

Primary Examiner—Edward F. Urban
Attorney, Agent, or Firm—Farkas & Manelli, P.L.L.C.

[57] ABSTRACT

A radio-frequency (RF) distribution system carriers multi-carrier RF signals having frequencies above 500 Mb over existing electric power wiring between a transceiver and one or more antennas. The transceiver and antennas can be connected to the power wiring, disconnected from the power wiring, relocated, and reconnected to the power wiring without installing conventional transmission lines.

10 Claims, 4 Drawing Sheets

DISTRIBUTING WIRELESS SYSTEM CARRIER SIGNALS WITHIN A BUILDING USING EXISTING POWER LINE WIRING

FIELD OF THE INVENTION

The invention relates to radio communication systems, and more particularly to systems for feeding radio-frequency (RF) signals to antennas.

BACKGROUND OF THE INVENTION

Many new types of wireless communication services, including so-called "personal communication services" (PCS) and cellular telephone system repeaters that are used when buildings or other obstruction create "dead spots" in a cell, serve relatively small areas, such as portions of an office building or groups of buildings. Such a communication system consists of a number of portable wireless units and at least one base station comprising one or more antennas associated with the base station and feed lines, typically coaxial cables, connecting the antennas with a transceiver in the base station. Each base station serves an area called a "microcell," which in some cases covers the entire service area of the communication system and in other cases is but one of many adjacent, centrally-controlled microcells that together provide coverage much like that of a traditional cellular telephone system, including "handing off" wireless units as they move from one microcell to another. As compared with a traditional cellular telephone system, the economic viability of microcell systems is more sensitive to the cost of installing antennas and feed lines because more microcells are required to cover a similarly-sized area and each microcell generally serves a smaller number of users, so each installation is amortized over fewer users.

Aggravating this sensitivity, these systems generally require several antennas to cover an entire microcell because obstacles often prevent signals from a single antenna from reaching all the parts of the microcell. Furthermore, during the installation of one of these systems it is often necessary to experiment with the number and location of the antennas to ensure that the low-power ultra-high frequency (UHF) signals propagate predictably throughout the microcell. After a system is operational, the relocation or installation of furniture or wall partitions can alter the propagation pattern of the signals and necessitate relocating antennas and/or installing additional antennas. In addition, changes in the needs of the users of the system, such as the expansion of a user community onto other floors of a building, can necessitate changes to the number and locations of the antennas that cover the microcell.

The installation and relocation of these antennas pose problems because coaxial cables must be run from the base station to the antennas and often permission to run the cables must first be obtained from a building's landlord. Coaxial cables and their installation and relocation are expensive and that cost generally cannot be recovered when an owner of a microcell system relocates to a different floor or building. Cable-fed antenna systems, therefore, are expensive and fail to provide the flexibility required during the installation and operational life of a microcell communication system.

SUMMARY OF THE INVENTION

The invention is a radio-frequency (RF) signal distribution system that uses the existing power wiring as transmission lines between a base station transceiver and one or more antennas. The system thus provides flexibility and reduces cost during the installation and operational life of a microcell system because antennas can be installed and relocated without installing or relocating conventional transmission lines. Each antenna is simply coupled to the existing power line by way of a conventional disconnectable coupler, such as a power receptacle or a lamp socket. If the antenna must be relocated, the antenna and its coupler are simply disconnected and reconnected at another location. Optionally, once a satisfactory location for an antenna is ascertained, the antenna can be coupled more permanently to the power line, such as by way of wire nuts in a junction box, thereby eliminating the risk of the antenna being accidentally disconnected. The signal distribution system performs inside a building and also among several buildings and outside a building.

BRIEF DESCRIPTION OF THE DRAWINGS

The above and further advantages of the invention may be better understood by referring to the following description in conjunction with the accompanying drawings in which.

DESCRIPTION OF THE PREFERRED EMBODIMENT

Figure 1:
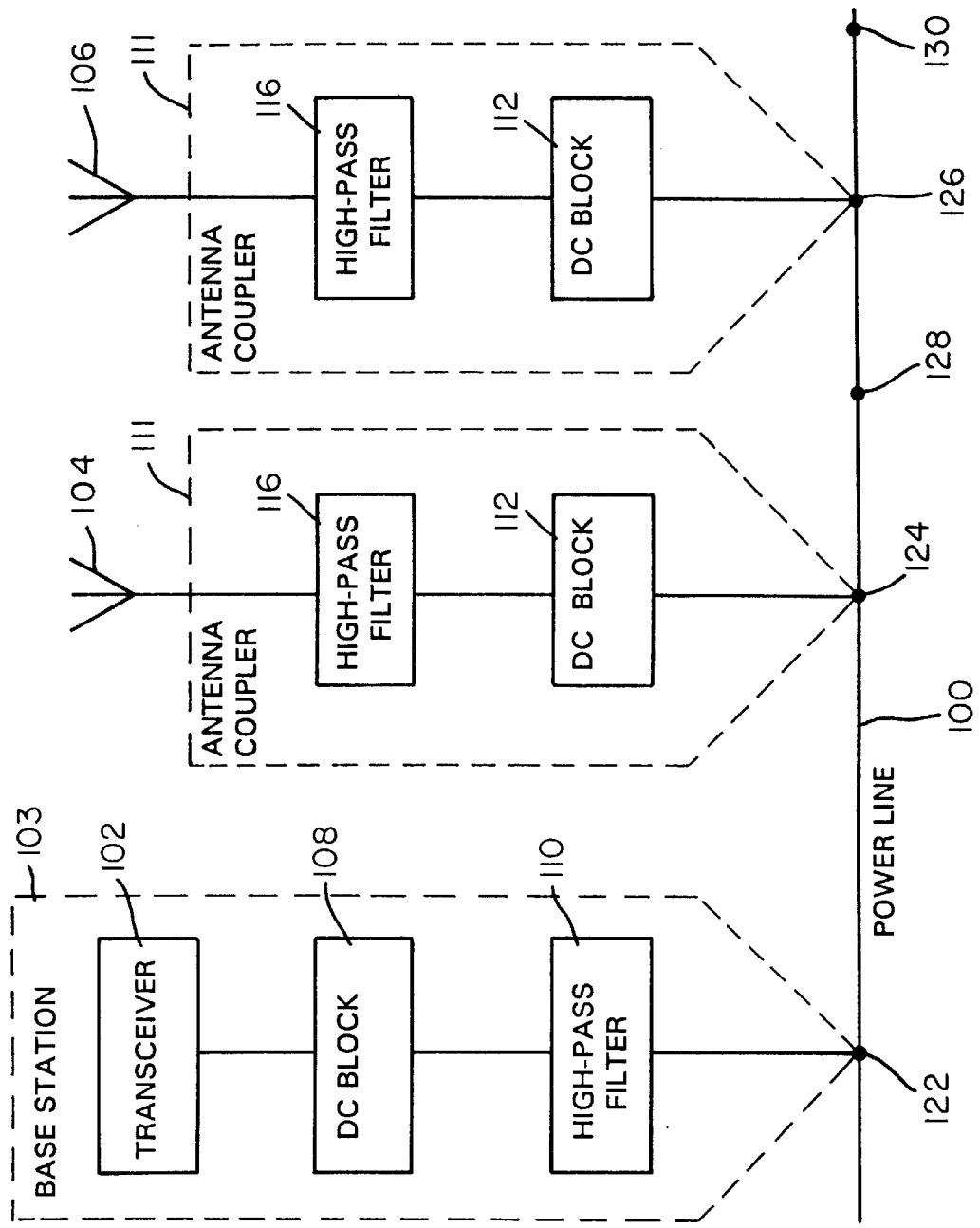
FIG. 1 is a block diagram of the preferred embodiment of the invention.

As shown in FIG. 1, RF signals travel along a power line 100 between a transceiver 102 of a base station 103 and one or more antennas, such as those indicated at 104 and 106. The transceiver 102 is coupled to the power line 100 through a direct current (DC) block 108 and a high-pass filter 110, which protect the transceiver from voltage spikes occurring on the power line and also from the normal power line voltage. Each antenna 104 and 106 is similarly coupled to the power line 100 through an antenna coupler 111, comprising a DC block 112 and a high-pass filter 116, to prevent power line noise, e.g. from motors, from reaching the antenna. The high-pass filters 110 and 116 pass the RF signals while blocking unwanted lower-frequency signals, such as power line noise.

Preferably, the RF signals travel along the neutral and ground wires of the power line 100, but any combination of these wires and the energized ("hot") wire can be used. Alternatively, when the neutral and ground wires are used, the DC blocks 108 and 112 and the high-pass filters 110 and 116 can be eliminated.

The transmission line and standing waves produced as a result of impedance mismatches between the base station 103 and the power line 100 and between the power line and the antennas 104 and 106 attenuate the RF signals. The presence of power transformers and other characteristics of the power wiring unique to each installation determine a maximum distance over which the system provides adequate signal strength, but generally the system provides signals of adequate strength to antennas located within several floors of a transceiver. Advantageously, microcells that are separated from one another by more than this distance can reuse frequencies, without co-channel interference. This frequency reuse enables the microcells to serve more concurrent users.

Figure 2:
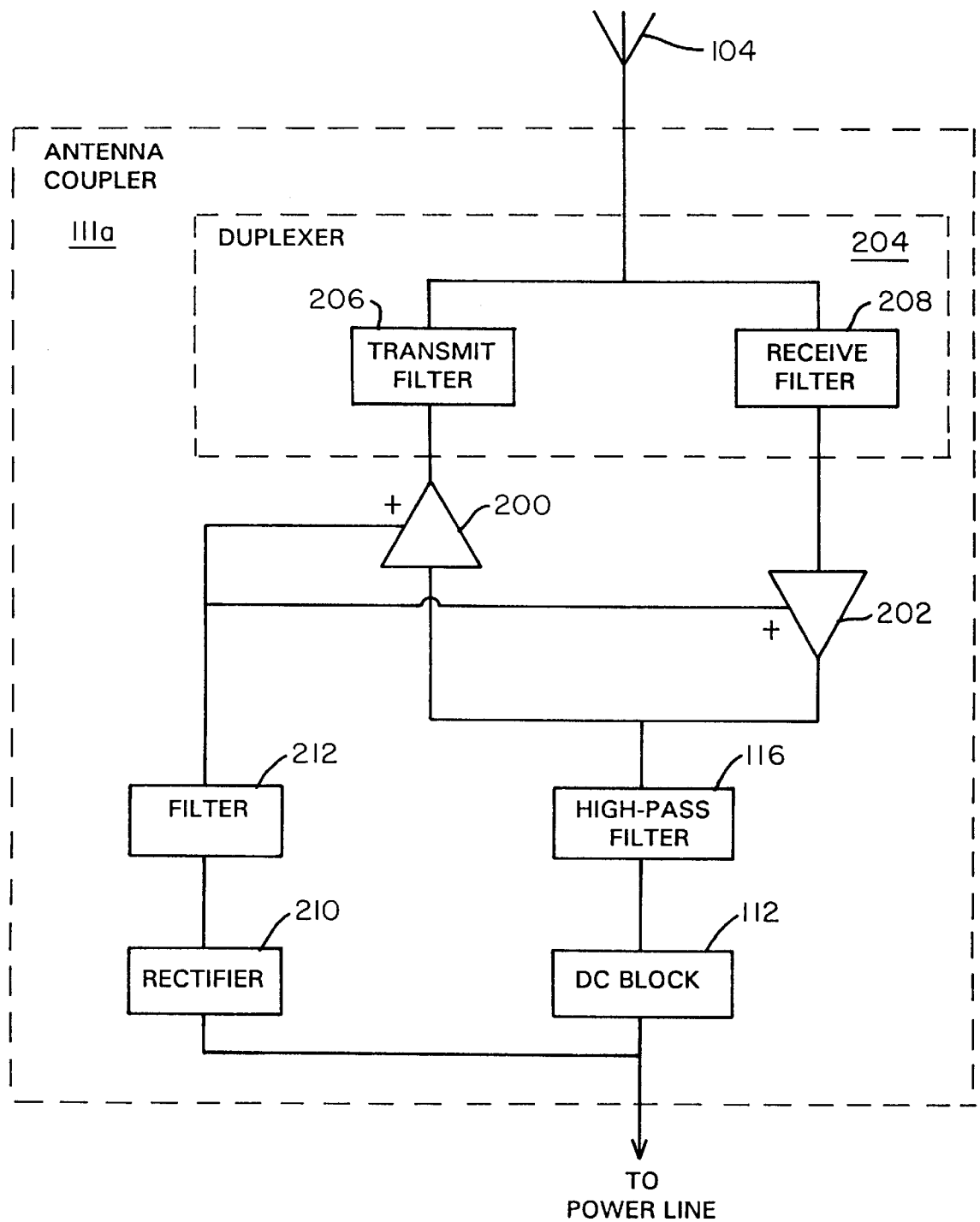
FIG. 2 is a block diagram of the antenna coupler in an alternate embodiment.

If, however, the attenuation of the RF signals is too severe, an alternate embodiment of the antenna coupler 111a, depicted in FIG. 2, provides amplifiers 200 and 202 to amplify the transmitted and received RF signals, respectively. Using well-known techniques, the alternate embodiment provides a duplexer 204, which consists of two bandpass filters 206 and 208. A rectifier 210 and a filter 212 provide DC power for the amplifiers 200 and 202 from the power line 100.

Referring again to FIG. 1, the base station 103 and the antenna couplers 111 are connected to the power line 100 at connection points 122, 124 and 126, respectively. Preferably, these connection points consist of power receptacles that are connected to the power line. Power plugs connected to the base station 103 and antenna couplers 111 facilitate disconnecting a base station or an antenna from the power line and reconnecting the disconnected base station or antenna to the power line at the same or at a different location, such as connection point 128 or 130.

Figure 3:
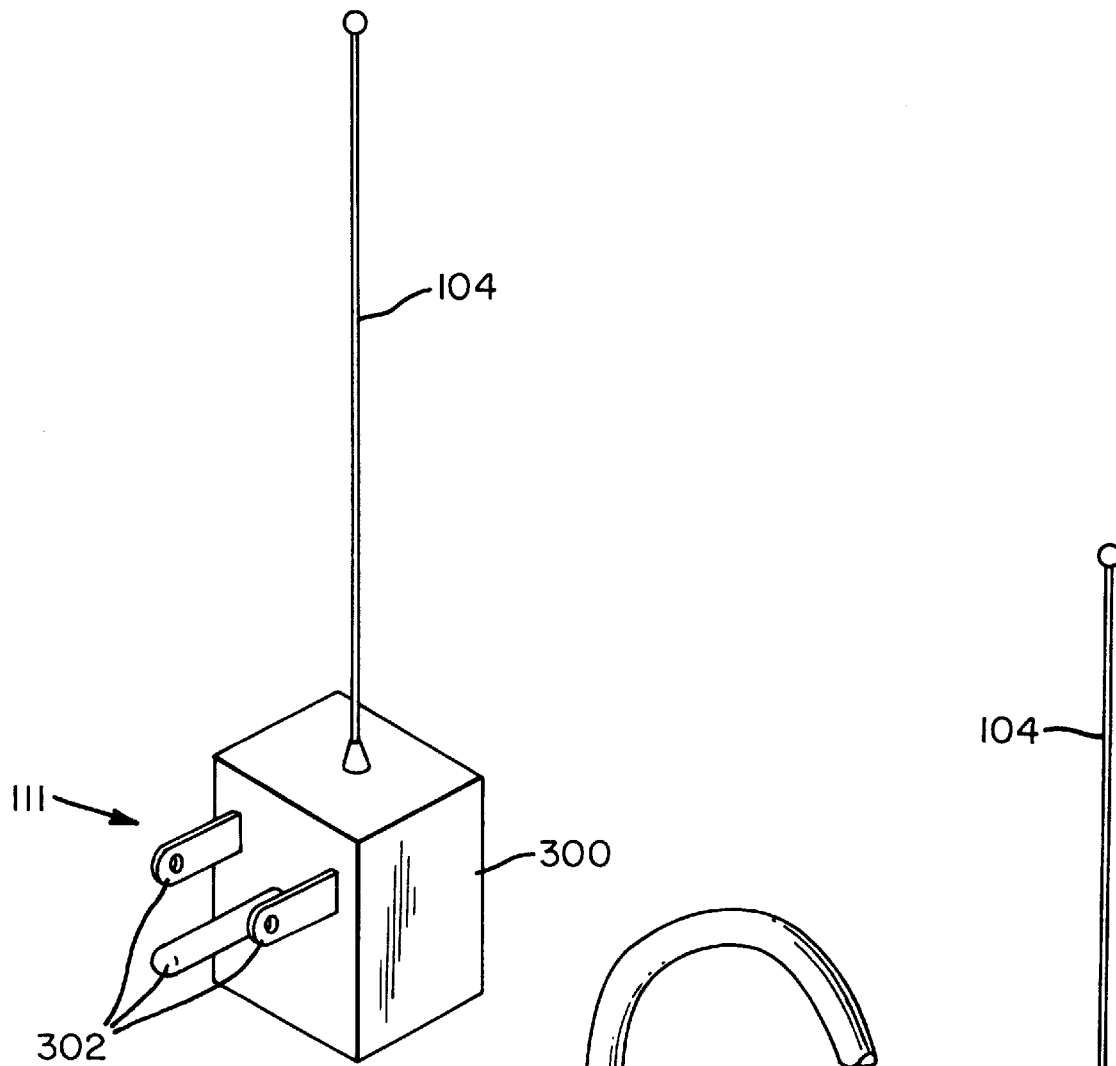
FIG. 3 is a perspective view of the antenna coupler in the preferred embodiment.
Figure 4:
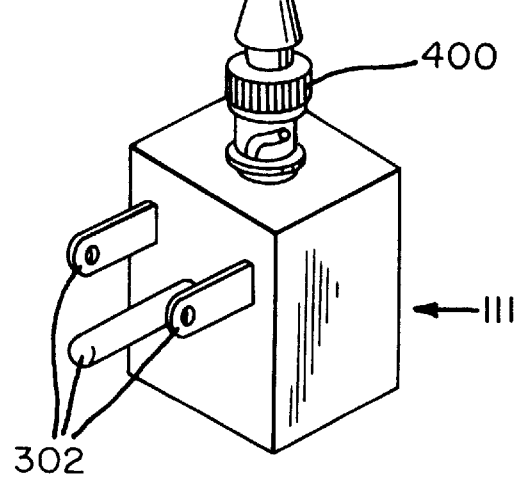
FIG. 4 is a perspective view of the antenna coupler in an alternate embodiment.
Figure 5:
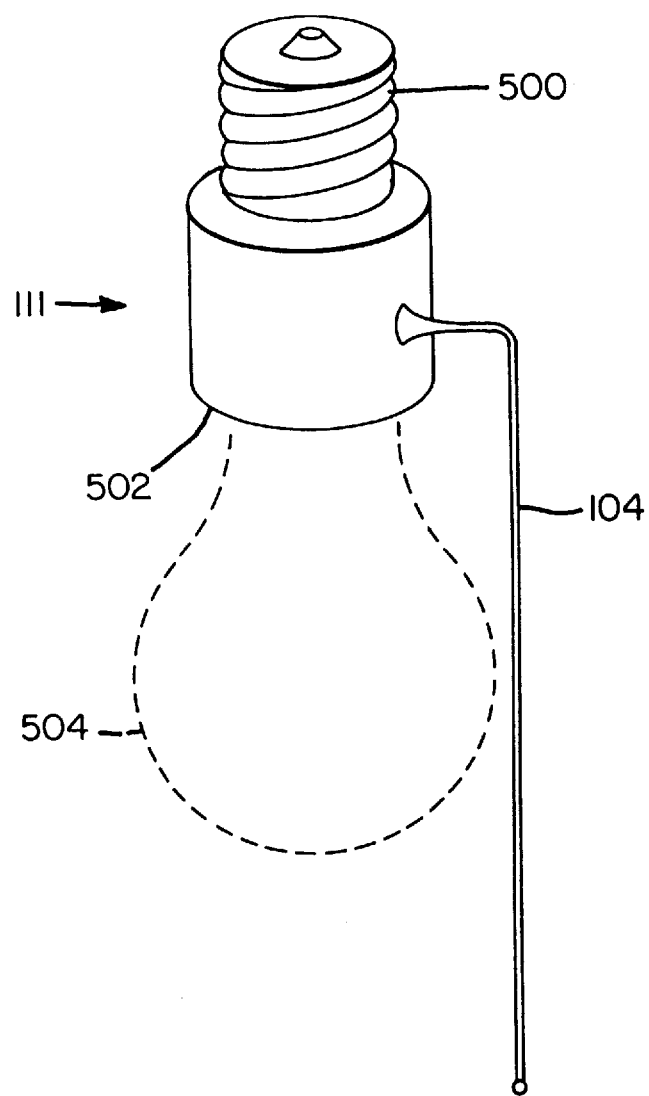
FIG. 5 is a perspective view of the antenna coupler in another alternate embodiment.

Preferably, as depicted in FIG. 3, each antenna 104 mounts directly to a housing 300 to which a power plug 302 or other disconnectable coupling mounts. In an alternate embodiment depicted in FIG. 4, an RF connector 400 allows an antenna 104 to be connected over a length of coaxial cable 402 to the antenna coupler 111. In another alternate embodiment depicted in FIG. 5, the antenna coupler is connected to the power line by a lamp base 500 that mates with a lamp socket (not shown). Such an antenna coupler can have a lamp socket 502 into which a lamp 504 can be connected.

It will therefore be seen that I have developed a method and apparatus for distributing RF signals between a base station and one or more antennas without the use of conventional transmission lines, which can be utilized with a variety of power lines and types of connection points. The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. In a wireless communication system wherein an area is divided into cells and at least one of the cells includes at least a part of a building, with a basestation located in said at least one of the cells to provide wireless communication to subscriber units located in said at least part of a building, the communication carried out by using modulated radio frequency (RF) carrier signals having a carrier signal frequency in excess of five-hundred MegaHertz (500 MHz), an apparatus for distributing the modulated RF carrier signals within the building using existing power line wiring within the building, the apparatus comprising:

a basestation radio transceiver for generating multi-carrier RF carrier signals having a carrier signal frequency in excess of 500 MHz intended for transmission to the subscriber units, and for receiving modulated multi-carrier RF carrier signals originating at the subscriber units;

a connector for connecting the modulated RF carrier signals provided by the basestation radio transceiver to the building power line wiring;

a plurality of antennas placed at various locations distributed within the building for transmitting RF carrier signals to subscriber units located in the building and for receiving RF carrier signals therefrom; and a plurality of antenna couplers, each antenna coupler connecting a respective one of the antennas to the building power line wiring to permit the modulated RF carrier signals to pass between the basestation radio transceiver and the antenna over the building power line wiring.

2. An apparatus as in claim 1 wherein the antenna coupler additionally comprises a first filter connected between the building power line wiring and the antenna for preventing signals of less than a predetermined frequency from passing between the building wiring and the antenna.

3. An apparatus as in claim 1 wherein the antenna coupler comprises a direct current block for preventing power lines voltages from connecting to the antenna.

4. An apparatus as in claim 1 wherein the antenna coupler additionally comprises an amplifier connected between the first filter and the antenna for amplifying the modulated RF carrier signals.

5. An apparatus as in claim 1 wherein the building power line wiring includes a ground conductor, a neutral conductor, and a hot conductor.

6. An apparatus as in claim 5 wherein the modulated RF carrier signals pass along the neutral conductor.

7. An apparatus as in claim 5 wherein the modulated RF carrier signals pass along the ground conductor.

8. An apparatus as in claim 5 wherein the modulated RF carrier signals pass along the hot conductor.

9. An apparatus as in claim 1 wherein the antenna coupler comprises a power line plug adapted to mate with a power receptacle, the existing power receptacle being connected to the building wiring, whereby the location of the antenna may be changed by unplugging the power plug and inserting it into a different power receptacle in a different location in the building.

10. An apparatus as in claim 1 wherein the antenna coupler comprises a lamp socket such that the antenna may be located in a different portion of the building by installing the antenna in a different lamp socket in a different location in the building.

* * * * *